United States Patent
Levert

(10) Patent No.: US 7,607,609 B2
(45) Date of Patent: Oct. 27, 2009

(54) MOUNTING DEVICE FOR AN AIRCRAFT ENGINE COMPRISING TWO THRUST RECOVERY RODS WITH A DOUBLE REAR MECHANICAL CONNECTION

(75) Inventor: Stéphane Levert, Toulouse (FR)

(73) Assignee: Airbus France, Toulouse (FR)

( * ) Notice: Subject to any disclaimer, the term of this patent is extended or adjusted under 35 U.S.C. 154(b) by 232 days.

(21) Appl. No.: 11/769,179

(22) Filed: Jun. 27, 2007

(65) Prior Publication Data

US 2008/0169377 A1 Jul. 17, 2008

(30) Foreign Application Priority Data

Jul. 10, 2006 (FR) .................................. 06 52890

(51) Int. Cl.
*B64D 27/00* (2006.01)
(52) U.S. Cl. ............................ 244/54; 248/554; 60/797
(58) Field of Classification Search .................. 244/54; 248/554; 60/39.31, 796, 797
See application file for complete search history.

(56) References Cited

U.S. PATENT DOCUMENTS 6,494,403 B2 * 12/2002 Jule et al. .................... 244/54
6,758,438 B2 * 7/2004 Brefort et al. ................ 244/54
7,108,224 B2 * 9/2006 Pasquer et al. ............... 244/54

FOREIGN PATENT DOCUMENTS

| EP | 1 136 355 A1 | 9/2001 |
| EP | 1 300 337 A1 | 4/2003 |
| EP | 1 481 897 A1 | 12/2004 |

\* cited by examiner

*Primary Examiner*—J. Woodrow Eldred
(74) *Attorney, Agent, or Firm*—Oblon, Spivak, McClelland, Maier & Neustadt, L.L.P.

(57) ABSTRACT

A mounting device for an aircraft engine includes a rigid structure and a device for mounting the engine on the rigid structure, the mounting device including a thrust load recovery device with two lateral thrust load recovery rods each having a rear end mounted on a crossbar of the recovery device with a first mechanical connection. At the rear end of each of the two rods, there is also provided a second mechanical connection with play between the rear end and a support fitting integral with the rigid structure. The first mechanical connection is implemented using a pin provided on the crossbar, passing through an orifice provided in the rear end of the rod.

11 Claims, 11 Drawing Sheets

MOUNTING DEVICE FOR AN AIRCRAFT ENGINE COMPRISING TWO THRUST RECOVERY RODS WITH A DOUBLE REAR MECHANICAL CONNECTION

TECHNICAL FIELD

The present invention relates in a general way to a mounting device for an aircraft engine, intended for example to be interposed between an aircraft wing and the engine concerned, and to an engine unit comprising a mounting device of this kind.

The invention may be used on any type of aircraft fitted with turbojets or turboprops.

This type of mounting device, also known as a mounting pylon or an EMS ("Engine Mounting Structure"), may be used equally well to suspend an engine under the wing of the aircraft, to mount this engine over this same wing, or otherwise to add this engine to the rear part of the aircraft fuselage.

PRIOR ART

A mounting device of this type is in fact provided to constitute the connection interface between a turbine engine and an aircraft wing. It allows the loads generated by its associated turbine engine to be transmitted to the structure of this aircraft, and also allows fuel, electrical systems, hydraulics and air to be conveyed between the engine and the aircraft.

To transmit the loads, the mounting device comprises a rigid structure, a so-called primary structure, often of the "box" type, in other words formed by assembling upper and lower spars and interconnected lateral panels by means of transverse grooves.

On the other hand, the device is fitted with mounting means interposed between the turbine engine and the rigid structure, these means comprising overall two engine mounts, and a device for recovering the thrust loads generated by the turbine engine.

In the prior art, this recovery device includes for example two lateral rods connected on the one hand to the turbine engine housing, and on the other hand added onto a crossbar, itself articulated on the rigid structure of the mounting device.

In the same way, the mounting device also comprises another set of mounts constituting a mounting system interposed between the rigid structure and the aircraft wing, this system being usually composed of two or three mounts.

Finally, the pylon is provided with a secondary structure that segregates and holds the systems while supporting aerodynamic fairings.

As has been mentioned above, the solutions previously proposed provide for the thrust load recovery device to incorporate a crossbar articulated on the rigid structure, by means of a connection axis. As such, it is pointed out that in order to fulfil a so-called "Fail Safe" function for the transmission of loads along the longitudinal direction, the crossbar is usually implemented using two superimposed fittings, just as the connection axis for its part takes the form of a doubled axis. Thus, in the event of one of the two superimposed fittings constituting the crossbar breaking, the other one recovers on its own the load coming from the lateral rods, and, in the event of the outer axis of the doubled connection axis breaking, it is then the inner axis which takes over so as to recover and transmit these same loads along the longitudinal direction.

If this solution is relatively widespread in prior art embodiments, it is still nonetheless disadvantageous in terms of mass and space requirement generated, mainly because of the doubling up on a certain number of parts, such as the crossbar or connection axis associated therewith. As has been pointed out above, this doubling up is implemented mainly so as to be able to transfer the loads even in the event of the breakage/failure of one of the elements of a doubled up part, this function being more commonly known as "Fail Safe".

Moreover, this solution does not allow the load path in normal operation and the so-called "Fail Safe" load path encountered in a failure/breakage mode to be fully dissociated, which poses obvious problems of design.

OBJECT OF THE INVENTION

The purpose of the invention therefore is to propose a mounting device and an engine unit including such a device that overcomes the drawbacks mentioned above, relating to embodiments in the prior art.

To do this, the object of the invention is a device for mounting an aircraft engine comprising a rigid structure and means for mounting the engine on the rigid structure, the mounting means comprising a device for recovering the thrust loads generated by the engine, this recovery device comprising two lateral thrust load recovery rods each having a rear end mounted on a crossbar of the device, by means of a first mechanical connection. Moreover, at the rear end of each of the two thrust load recovery rods, there is also provided a second mechanical connection with play between the rear end and a support fitting integral with the rigid structure. According to the invention, the first mechanical connection is made using a pin provided on the crossbar, passing through an orifice provided in the rear end of the rod.

Thus, it should be understood that the present invention proposes a particular design allowing a "Fail Safe" function to be provided without having to double up on some parts such as the crossbar or the connection axis associated therewith, which secures to advantage a gain in terms of mass and space requirement.

Indeed, in the event of the crossbar or its connection axis failing or breaking, the load path is then partially constituted by the second mechanical connection or connections which become active, whereas the play initially provided is arranged such that they remain inactive in normal operation, in other words no load is intended to pass through them as long as the thrust load recovery device does not encounter any failure/breakage.

In other words, in normal operation, the loads along the longitudinal direction coming from the lateral recovery rods are transmitted to the crossbar through the first mechanical connections, and are then conveyed to the rigid structure by means of the connection axis on which the crossbar is articulated. Furthermore, in failure/breakage mode of the crossbar or its associated axis, the loads along the longitudinal direction coming from the lateral recovery rods are transmitted to the rigid structure using the second mechanical connections, via the support fittings integral with this same structure, the two aforementioned support fittings being able possibly to take the form of one and the same single fitting. Moreover, in failure/breakage mode of one of the two recovery rods, the loads along the longitudinal direction are transmitted to the rigid structure via the second mechanical connection of the non-failing rod, via its associated support fitting integral with this same structure.

In this way, it follows also from what has been said before that the proposed arrangement ensures a particular dissociation between the load path in normal operation and the so-called "Fail Safe" load path as encountered in a failure/breakage mode, which facilitates the design of the thrust load recovery device.

Moreover, as mentioned above, provision is made for the first mechanical connection to be implemented using a pin provided on the crossbar, passing through an orifice provided in the rear end of the rod, which overall facilitates the mounting of this connection.

Preferably, the second mechanical connection is located at the rear relative to the first mechanical connection.

Preferably, the orifice provided in the rear end of the rod is equipped with a ball-and-socket joint passed through by the pin provided on the crossbar. Additionally, it is preferentially arranged such that each of the two pins provided on the crossbar is arranged so as to extend substantially transversely relative to the mounting device, which facilitates the mounting of this connection. In this configuration where each pin extends therefore substantially along the transverse direction of the device or in a way slightly inclined relative thereto, the installation and manipulation of the equipment for mounting the rear rod ends generates almost no risk of deterioration of the engine unit, insofar as the free tip of each pin is orientated towards an uncrowded area of this engine unit. Moreover, the ease of assembly obtained by an arrangement of this kind allows a saving to be made in terms of assembly time, the latter being moreover also optimised by the fact that the rear ends of the lateral rods can now easily be fitted into their associated pin by a straightforward substantially lateral movement of these rods, initially connected to the engine by their front end.

Still preferentially, the second mechanical connection is implemented using a clevis provided on the rear end of the rod and an orifice provided in the support fitting, this clevis and the orifice being passed through with play by a connection axis. Naturally, it would also be possible to provide a reverse configuration wherein the rear end of the rod is equipped with the orifice and the support fitting equipped with the clevis, without departing from the framework of the invention.

Preferably, the engine mounting means also include a front engine mount and a rear engine mount anchored to the rigid structure, the front engine mount being designed to recover the loads being exerted along a transverse direction of the device and along the vertical direction of this device, and the rear engine mount being designed to recover the loads being exerted along the transverse and vertical directions of the device and to recover the momentum being exerted along a longitudinal direction of this device.

As is usually the case, the two lateral thrust load recovery rods are preferably arranged on either side of a vertical and longitudinal median plane of the mounting device.

Additionally, another object of the invention is an engine unit including an engine such as a turbojet and a device for mounting this engine, the mounting device being like the one which has just been described.

Lastly, the invention also relates to an aircraft comprising at least one engine unit like the one indicated above, assembled on a wing or on a rear fuselage part of this aircraft.

Other advantages and characteristics of the invention will emerge in the detailed non-restrictive description below.

BRIEF DESCRIPTION OF THE DRAWINGS

This description will be given in conjunction with the appended drawings among which.

DETAILED DESCRIPTION OF PREFERRED EMBODIMENTS

Figure 1:
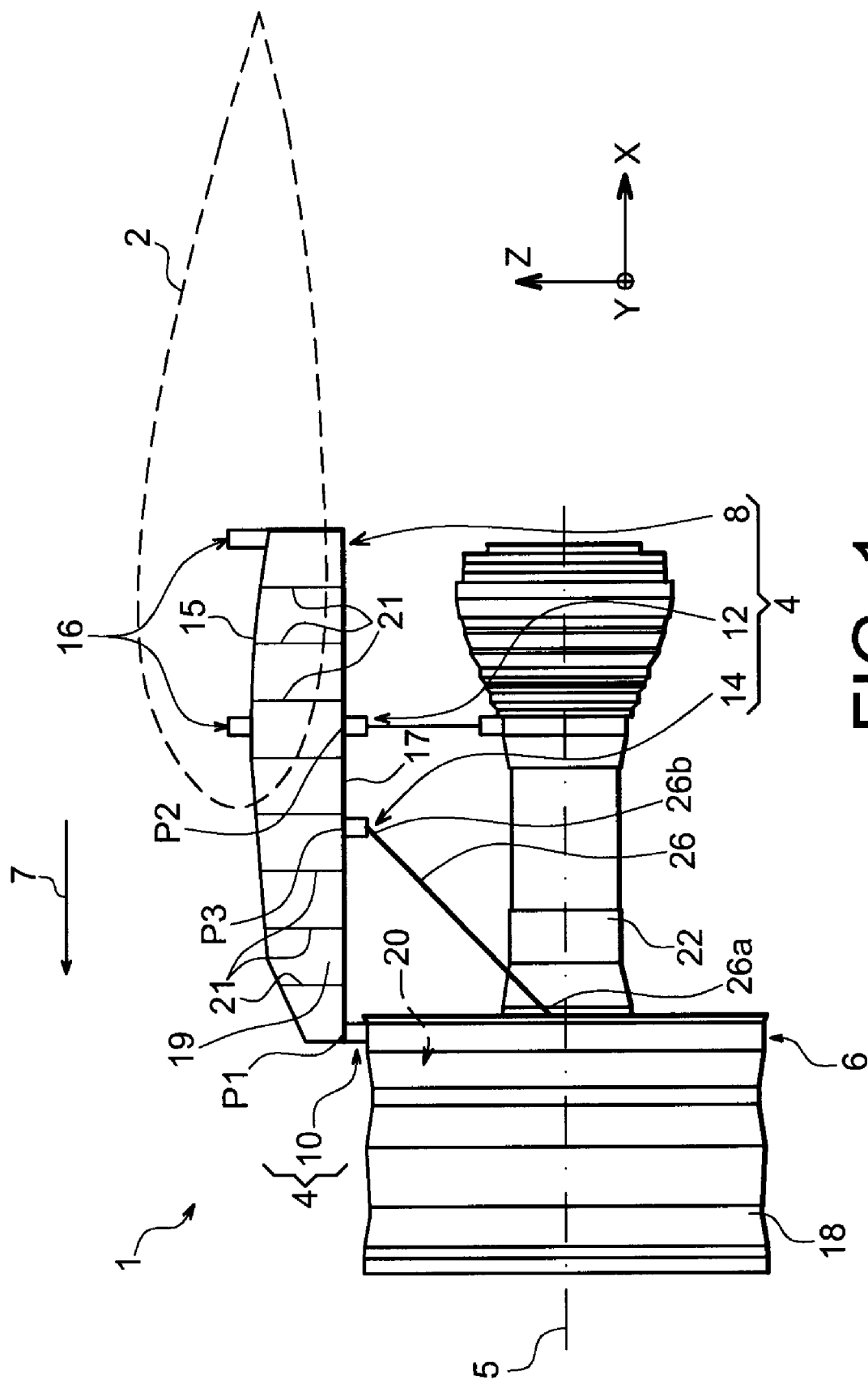
FIG. 1 shows a side view of an aircraft engine unit, including a mounting device according to a first preferred embodiment of the present invention.

With reference to FIG. 1, an aircraft engine unit 1 can be seen intended to be anchored under a wing 2 of this aircraft shown only in dotted lines in the diagram for reasons of clarity, this unit 1 comprising a mounting device 4 according to a first preferred embodiment of the present invention, and an engine 6 such as a turbojet retained under this device 4.

Overall, the mounting device 4 comprises a rigid structure 8 carrying means for mounting the engine 6, these mounting means having a plurality of engine mounts 10, 12 and a device for recovering the thrust loads 14 generated by the engine 6.

For information purposes, it should be noted that the unit 1 is intended to be surrounded by a pod (not shown), and that the mounting device 4 comprises another set of mounts 16 allowing this unit 1 to be suspended under the wing 2 of the aircraft.

In the whole of the following description, by convention, the reference X is given to the longitudinal direction of the device 4 which is also comparable to the longitudinal direction of the turbojet 6, this direction X being parallel to a longitudinal axis 5 of this turbojet 6 and to that of the device 14. On the other hand, the reference Y is given to the direction orientated transversely relative to the device 4 and also comparable to the transverse direction of the turbojet 6 and to that of the device 14, and Z to the vertical or height direction, these three directions X, Y, Z being orthogonal to each other.

On the other hand, the terms "front" and "rear" should be considered relative to a direction of forward movement of the aircraft encountered subsequent to the thrust exerted by the turbojet 6, this direction being shown in the diagram by the arrow 7.

In FIG. 1 can be seen the two engine mounts 10, 12, the set of mounts 16, the thrust load recovery device 14 and the rigid structure 8 of the mounting device 4. The other not shown constituent elements of this device 4, such as the secondary structure segregating and holding the systems while supporting aerodynamic fairings, are conventional elements identical or similar to those encountered in the prior art, and known to the person skilled in the art. Consequently, no detailed description will be given thereof.

On the other hand, it is pointed out that the turbojet 6 has at the front a fan housing 18 of large dimension delimiting an annular fan channel 20, and comprises towards the rear a central housing 22 of smaller dimension, enclosing the core of this turbojet. The housings 18 and 20 are of course integral one with the other.

As can be seen in FIG. 1, the engine mounts 10, 12 of the device 4 are provided to be two in number, and known respectively as front engine mount and rear engine mount.

In this preferred embodiment of the present invention, the rigid structure 8 takes the form of a box extending from the rear towards the front, substantially along the direction X.

The box 8 then takes the form of a pylon similar in design to that usually observed for turbojet mounting pylons, particularly in the sense that it is implemented by the assembly of an upper spar 15, a lower spar 17, and two lateral spars/panels 19 (only one being visible because of the side view), these elements 15, 17, 19 being connected to each other by means of transverse ribs 21 each taking overall the form of a rectangle. In this way, the ribs 21 extend in planes YZ, the spars 15, 17 extend roughly in planes XY, and the lateral panels 19 in planes XZ.

The mounting means of this first preferred embodiment comprise first of all the front engine mount 10 interposed between a front end of the rigid structure 8 also known as pyramid, and an upper part of the fan housing 18. Nonetheless, it would be also possible to provide for the front engine mount 10 to be anchored to a connection housing between the central housing and the fan housing, as is known to the person skilled in the art. The front engine mount 10, designed in a conventional way known to the person skilled in the arts, is anchored at a first point P1 of the rigid structure 8, the latter being also known as the primary structure.

On the other hand, the rear engine mount 12, also implemented in a conventional way known to the person skilled in the art is, for its part, interposed between the rigid structure 8 and the central housing 22 and anchored at a second point P2 of the rigid structure 8 placed to the rear relative to point P1.

In this first preferred embodiment, the thrust load recovery device 14 is anchored at a third point P3 of the rigid structure 8, the point P3 being located between the two points P1 and P2.

Overall, the recovery device 14 has two lateral thrust load recovery rods 26 (only one being visible in FIG. 1), each of these rods comprising a front end 26a connected to the fan housing 18, for example on or in proximity to a horizontal median plane of the turbojet 6.

Figure 2:
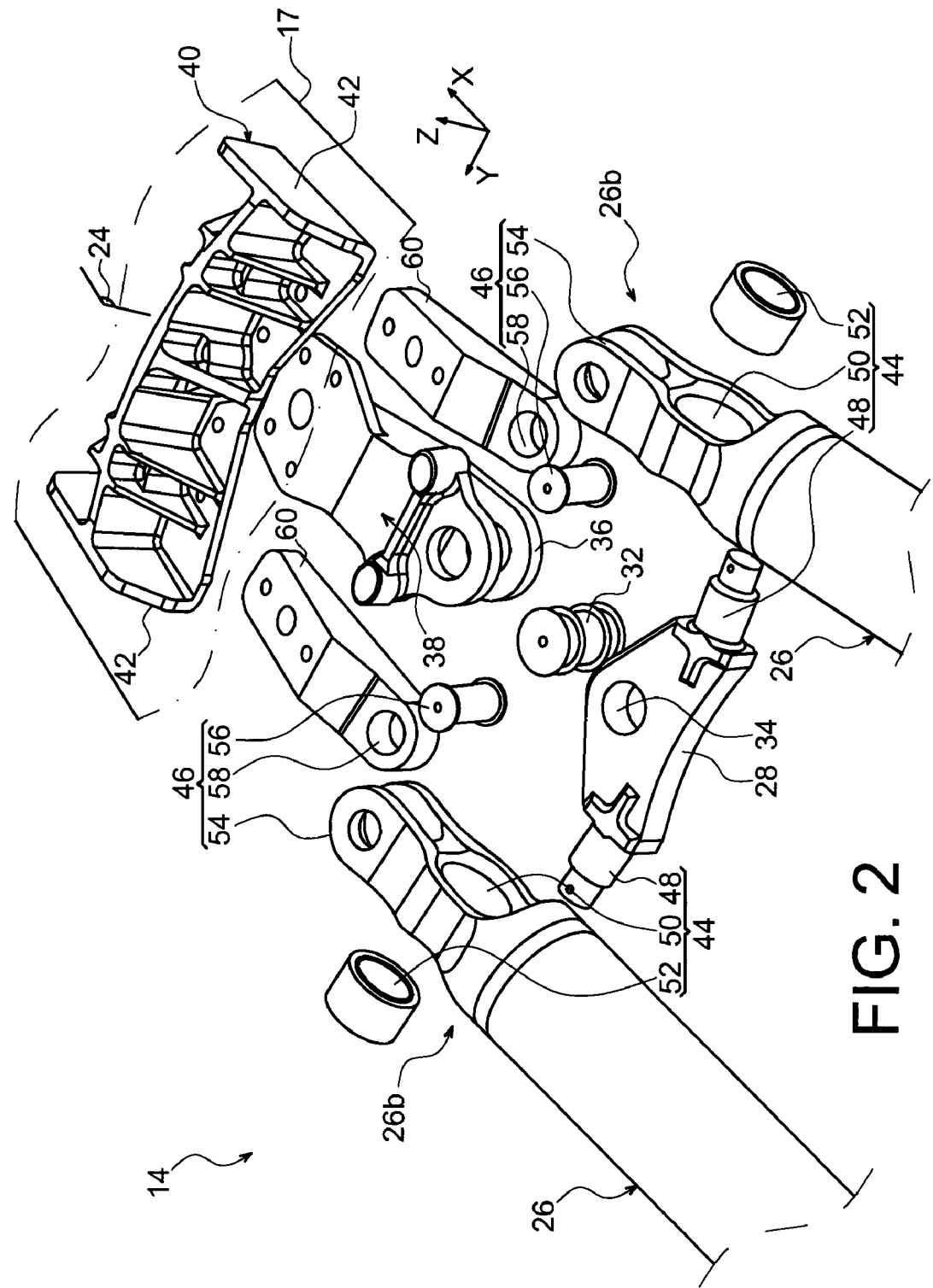
FIG. 2 shows a partial exploded view in perspective of the thrust load recovery device belonging to the mounting device shown in FIG. 1.
Figure 3:
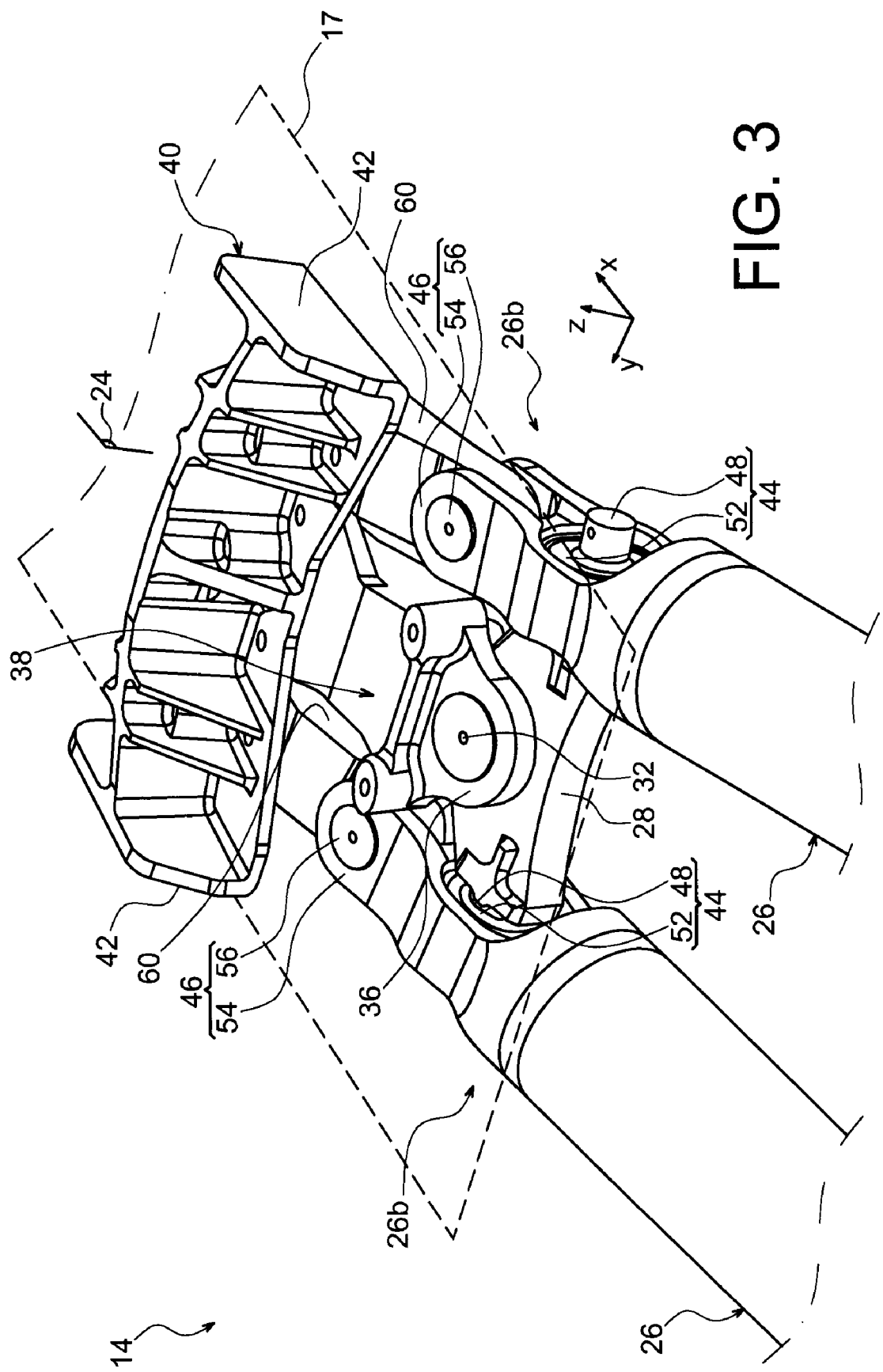
FIG. 3 shows an unexploded view of the thrust load recovery device shown in FIG. 2.

The rear part of this recovery device 14 will now be explained in detail with reference to FIGS. 2 and 3.

In these figures it can be seen that the two lateral rods 26, arranged on either side of the vertical and longitudinal median plane 24 of the mounting device also corresponding to a vertical median plane of the turbojet, each have a rear end 26b connected to a crossbar 28, as will be explained in detail below.

The crossbar 28 is coupled to an articulation axis 32, preferably of the single axis and not double axis type, positioned so as to be passed through by the vertical and longitudinal median plane 24. This articulation axis of the crossbar therefore passes through an orifice 34 provided in the crossbar 28 itself, and a clevis 36 the two sides of which are arranged on either side of the crossbar 28, this clevis 36 belonging to a fitting 38 for connection to the rigid structure. Indeed the connection fitting 38 has a rear end added in a fixed way under the lower spar 17 with which it is preferably in contact, the assembly means used (not shown), for example of the bolt type, coming to engage with a reinforcement fitting 40 housed inside the box, and being preferably in contact with the inner surface of the lower spar 17. In this respect, provision may be made for this reinforcement fitting 40 to have two lateral sides 42 intended to be anchored to two wings (not shown) respectively of the lower spar 17 of the box, its lower side therefore conforming in shape to the inner surface of this same lower spar 17. In this way, the reinforcement fitting 40 is similar to the transverse ribs of the box, with a difference that it does not extend over the whole height of the rigid structure.

To assemble the rear end 26b of each rod 26, provision is made for a first mechanical connection 44 and a second mechanical connection 46 located further back than the first.

To be more precise, the first mechanical connection, constituting the connection through which the thrust loads are intended to pass in normal operation, is implemented using a pin 48 provided on the associated lateral end of the crossbar 28. This pin 48, extending preferably substantially transversely relative to the device 14, namely substantially along the direction Y even if it may be slightly inclined relative to this direction, penetrates into an orifice 50 provided on the rear end 26b of the rod 26 concerned, the axis of this orifice then being substantially merged with that of the aforementioned pin 48. Provision is preferably made for this pin 48 to extend not only substantially transversely relative to the device 14, but also orthogonally relative to the axis of the lateral rod 26 which it passes through.

In this way, with this configuration, the installation and manipulation of the equipment needed to assemble the connection 44 generate almost no risk of deterioration of the engine unit, insofar as the free tip of each pin 48 is orientated towards an uncrowded area of the engine unit. Moreover, the ease of assembly obtained by an arrangement of this kind allows a saving to be made in terms of assembly time, the latter being moreover also optimised by the fact that the rear ends of the lateral rods may easily be fitted into their associated pin by a simple substantially lateral movement of these rods, initially connected to the engine by their front end 26a. Preferably, even if it has not been shown, provision is made for each pin to extend along an axis located in a solid angle of cone of revolution form of central axis corresponding to a transverse direction of the mounting device, and with a value less than or equal to $2\pi \cdot (1-\cos(15°))$ sr.

Moreover, a ball-and-socket joint 52 is provided between the orifice 50 and the pin 48, the latter passing through an inner bush of the ball-and-socket joint while the outer bush thereof is accommodated in a fixed way in the orifice 50.

One of the particularities of the present invention lies in the fact of providing the second mechanical connection with play 46 on the rear end 26b of each rod 26, the play acting to render this connection 46 inactive as long as its first associated connection 44 is not subject to breakage/failure. It should be noted that the connection 46 is designed to be able to recover loads in the event of breakage/failure, both in thrust mode and thrust reverser mode.

To do this, the second mechanical connection is implemented using a clevis 54 provided on the end 26b of the rod to the rear of the orifice 50, and an orifice 58 provided in a front end of a support fitting 60 housed between the two sides of this same clevis 54. Moreover, a connection axis 56 passes with play through the clevis 54 and the orifice 58, this axis 56, preferably single, being for example substantially orientated along the direction Z, but being able to be orientated along any other direction without departing from the framework of the invention. Preferably, the support fitting 60 is located substantially in the extension of the axis of its associated rod 26.

The rear end of each of the two support fittings 60 is mounted on the box in the same way as the connection fitting 38, namely by conforming in shape externally to the lower spar 17 and by being assembled thereto by means of conventional assembly means (not shown) engaging with the reinforcement fitting 40.

Additionally, it is pointed out that in failure/breakage mode of the crossbar 28 or of its associated axis 32, the loads along the longitudinal direction coming from the lateral rods 26 are transmitted to the rigid structure through the second mechanical connections 46, via the support fittings 60 integral with this same structure and arranged symmetrically relative to the vertical and longitudinal median plane 24. On the other hand, in the failure/breakage mode of one of the two recovery rods 26, the loads along the longitudinal direction are transmitted to the rigid structure through the second mechanical connection 46 of the non-failing rod 26, via its associated support fitting 60. In both these cases of failure/breakage, the secondary connection 46 becomes active by its axis 56 coming into contact with the front end of the fitting 60 which it passes through.

Figure 4:
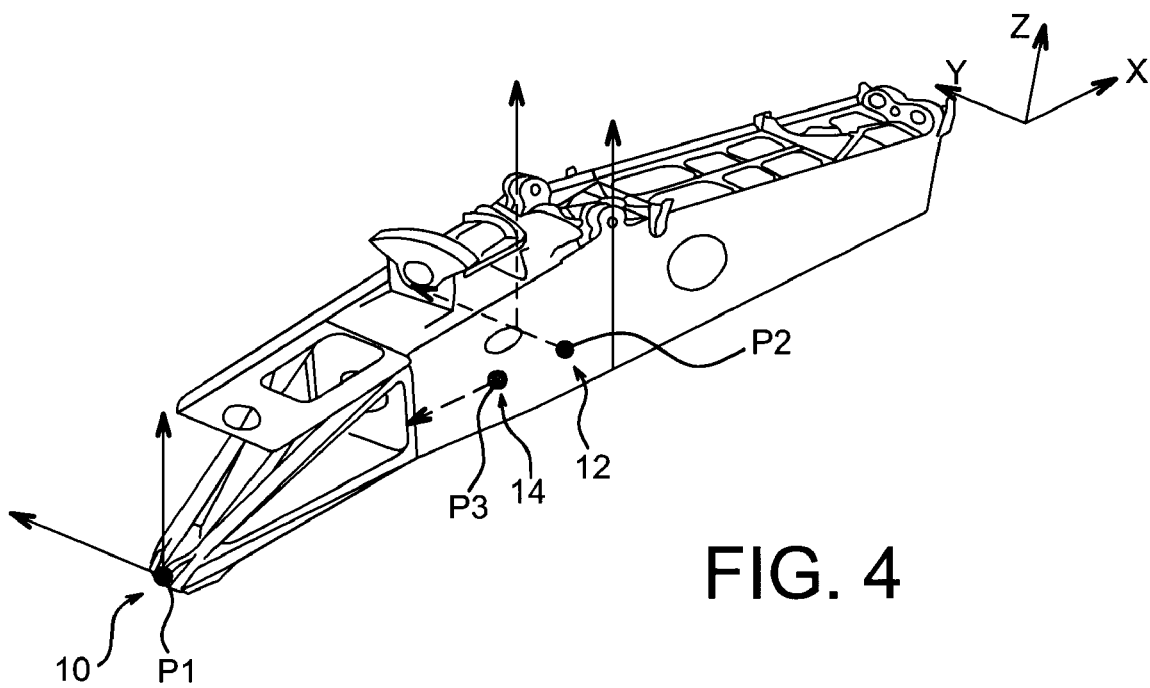
FIG. 4 shows a diagrammatic perspective view showing the load recovery provided by the different constituent elements of the mounting means of the device shown in FIG. 1.

With an arrangement of this kind, as can be seen in diagrammatic form in FIG. 4, the front engine mount 10 anchored at the point P1 is designed to recover the loads exerted mainly along the vertical direction Z, and along a transverse direction Y, but not adapted to recover loads exerted along the longitudinal direction X.

The rear engine mount 12 is, for its part, designed to recover loads exerted mainly along the transverse direction Y, and its selected design is preferably of a known type called "half-mounts" allowing each of these half-mounts (not shown) to recover loads exerted mainly along the vertical direction Z. The rear mount is also capable of recovering the momentum being exerted along the direction X.

Finally, the recovery device 14 is in a position to recover loads exerted mainly along the longitudinal direction X.

In this way, the loads being exerted along the longitudinal direction X are exclusively recovered by the thrust load recovery device, the loads being exerted along the transverse direction Y are recovered jointly by the front 10 and rear 12 mounts, and the loads being exerted along the vertical direction Z are also recovered jointly by the front mount 10 and the two half-mounts of the rear mount 12.

On the other hand, the momentum being exerted along the direction X is recovered solely by the two half-mounts of the rear mount 12, whereas the momentums being exerted along the directions Y and Z are recovered jointly by these two engine mounts 10, 12.

Figure 5:
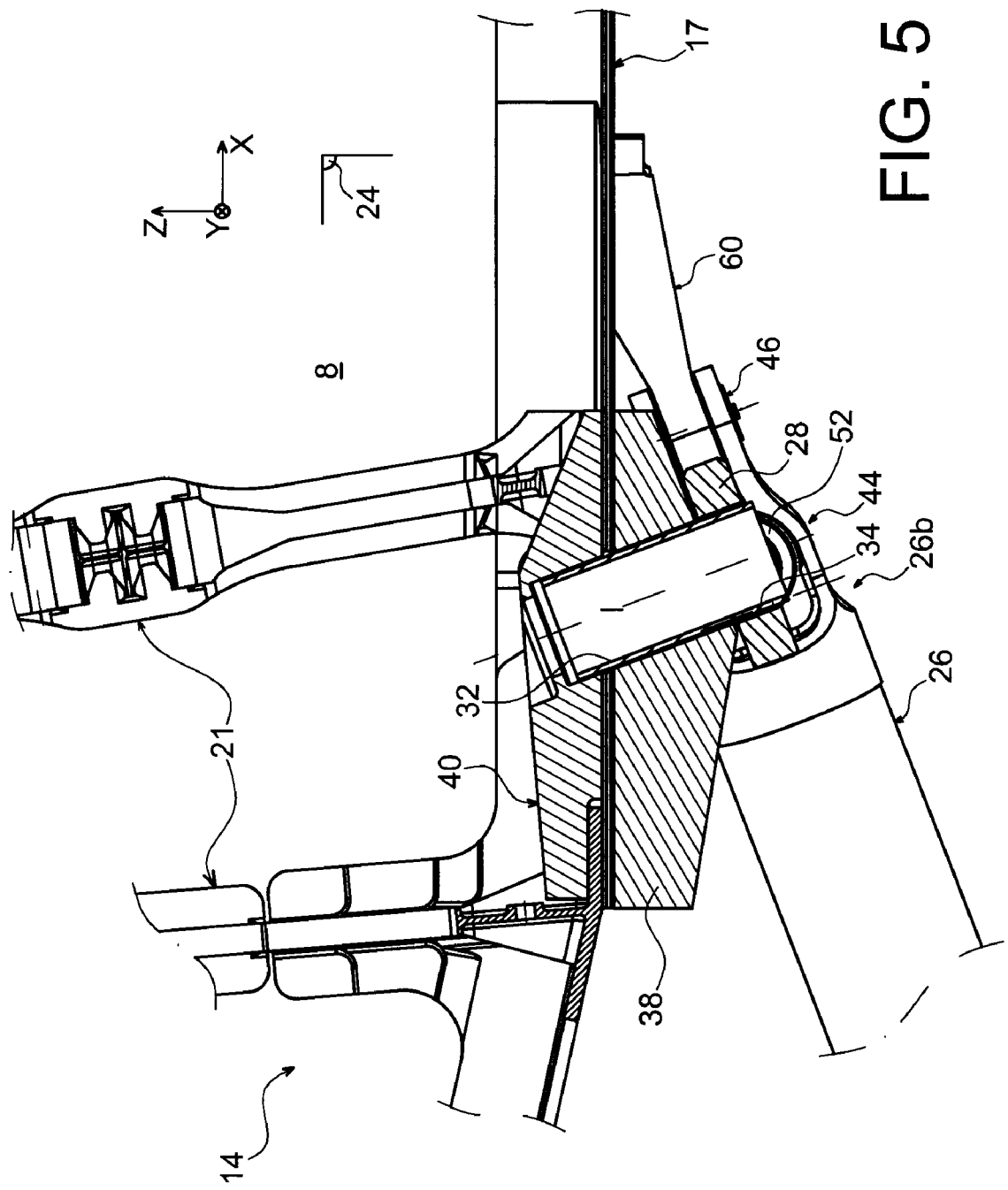
FIG. 5 shows a partial view in longitudinal cross-section of a thrust load recovery device presenting itself in the form of a second preferred embodiment of the present invention.

With reference now to FIG. 5, showing a rear part of the recovery device 14 according to a second preferred embodiment of the present invention, it can be seen that the main difference with the first embodiment described above lies in the design of the connection fitting 38 carrying the crossbar 28. As such, it should be noted that this figure taken in cross-section along the vertical and longitudinal median plane 24 of the mounting device, the elements bearing the same numerical references as in the other figures correspond to identical or similar elements.

The connection fitting 38 has an upper surface added in a fixed way under the lower spar 17 with which it is preferably in contact, the assembly means used (not shown), for example of the bolt type, coming to engage with a reinforcement fitting 40 housed inside the box, and being preferably in contact with the inner surface of the lower spar 17.

Nonetheless, unlike the first embodiment, it has an orifice to accommodate the articulation axis 32 of the crossbar 28 which is no longer carried forwards, but which is substantially centred on this same fitting 38. Moreover, this orifice for housing the articulation axis 32 is extended upwards via an orifice provided in the reinforcement fitting 40, such that the axis 32 is able to pass successively through said reinforcement fitting 40, the lower spar 17, the connection fitting 38, and finally the orifice 34 of the crossbar 28. For information purposes, it should be noted that the three elements 40, 17 and 38 are preferably superimposed and in contact two by two, as is shown in FIG. 5.

In this way, in this second preferred embodiment, the support fittings 60, at which the second mechanical connections 46 are found, extend rearwards beyond the connection fitting 38 of the crossbar, their rear ends still being added on the box 8, and to be more precise on the lower spar 17.

Figure 6:
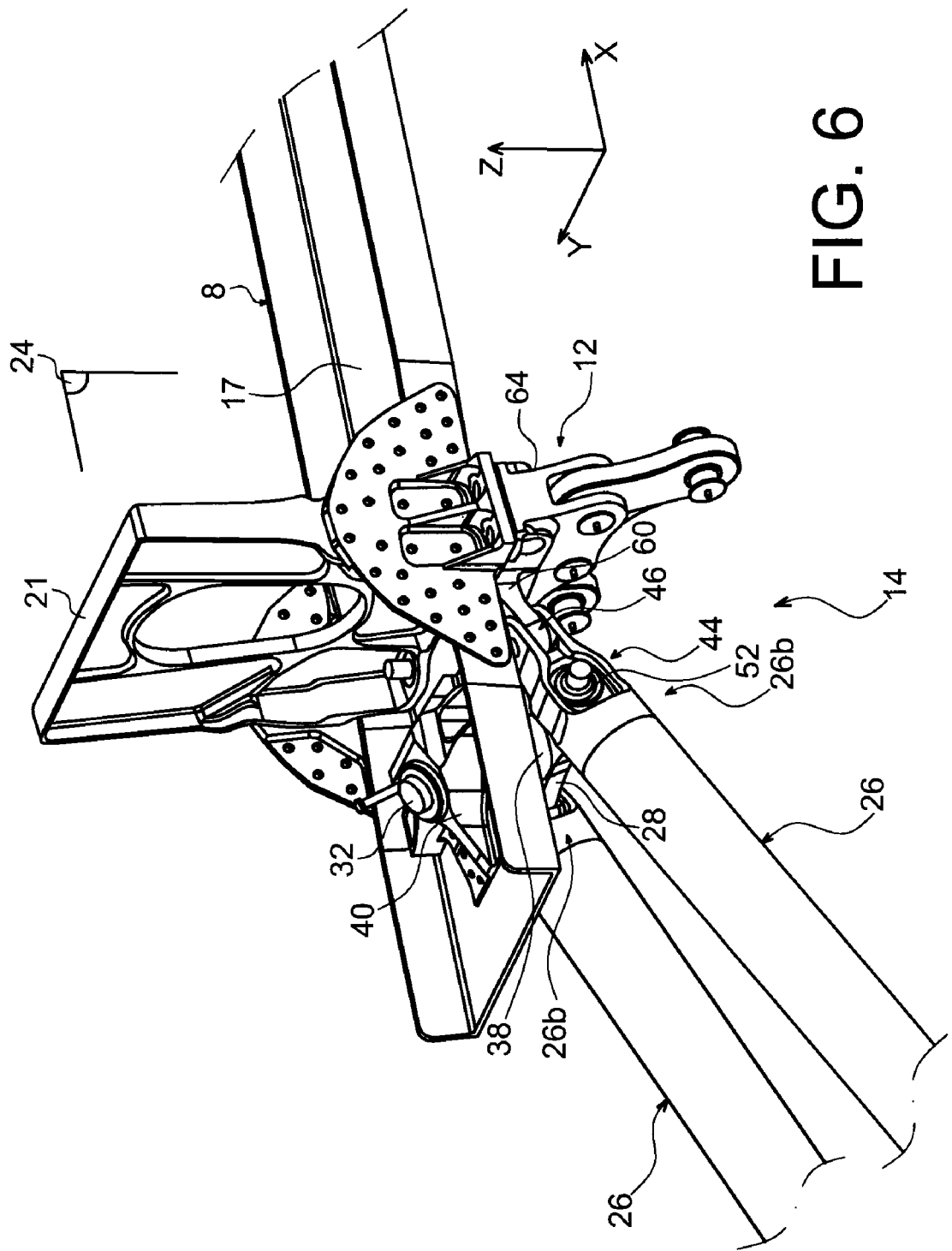
FIG. 6 shows a partial perspective view of a thrust load recovery device presenting itself in the form of an alternative to the second preferred embodiment of the present invention.

In FIG. 6 showing an alternative for implementing the second embodiment, it can be seen that only the connection of the support fittings 60 differs relative to that of the arrangement shown in FIG. 5, the connection of the crossbar 28 being in fact identical or similar to the one relating to the arrangement shown in this same FIG. 5. Indeed, the rear ends of the two support fitting is 60 (only one being visible in FIG. 6 because of the perspective view) are no longer added directly onto the lower spar 17, but are carried in a fixed way by a principal body 64 of the rear engine mount 12, itself mounted in a fixed way on the lower spar 17, underneath it. In this way, this arrangement constitutes another possibility allowing the two support fittings 60 to be made integral with the rigid structure 8, via the principal body 64 of the rear engine mount 12.

To be more precise, the principal body 64 forming devises and carrying connecting links, orientated substantially transversely, may be such that it is implemented all in one piece with the two support fittings 60 projecting forwards.

With reference to FIGS. 7a to 7e, different successive steps can be seen in a method for assembling the mounting device 14, the views shown being taken overall from underneath.

Figure 7A:
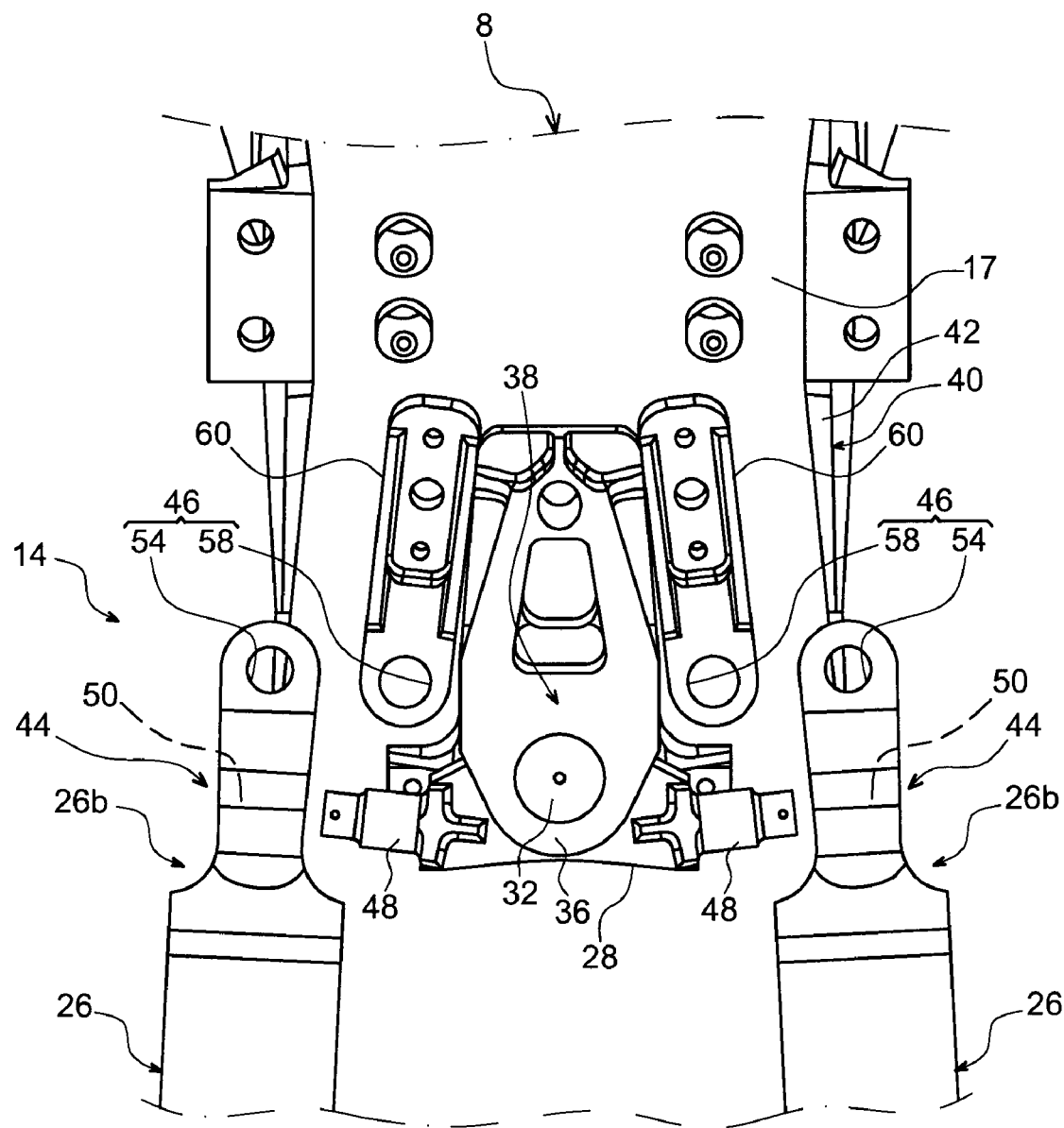
FIGS. 7a and 7e show views in diagrammatic form of the assembly of the rear end of each of the two thrust load recovery rods on its associated crossbar pin.
Figure 7B:
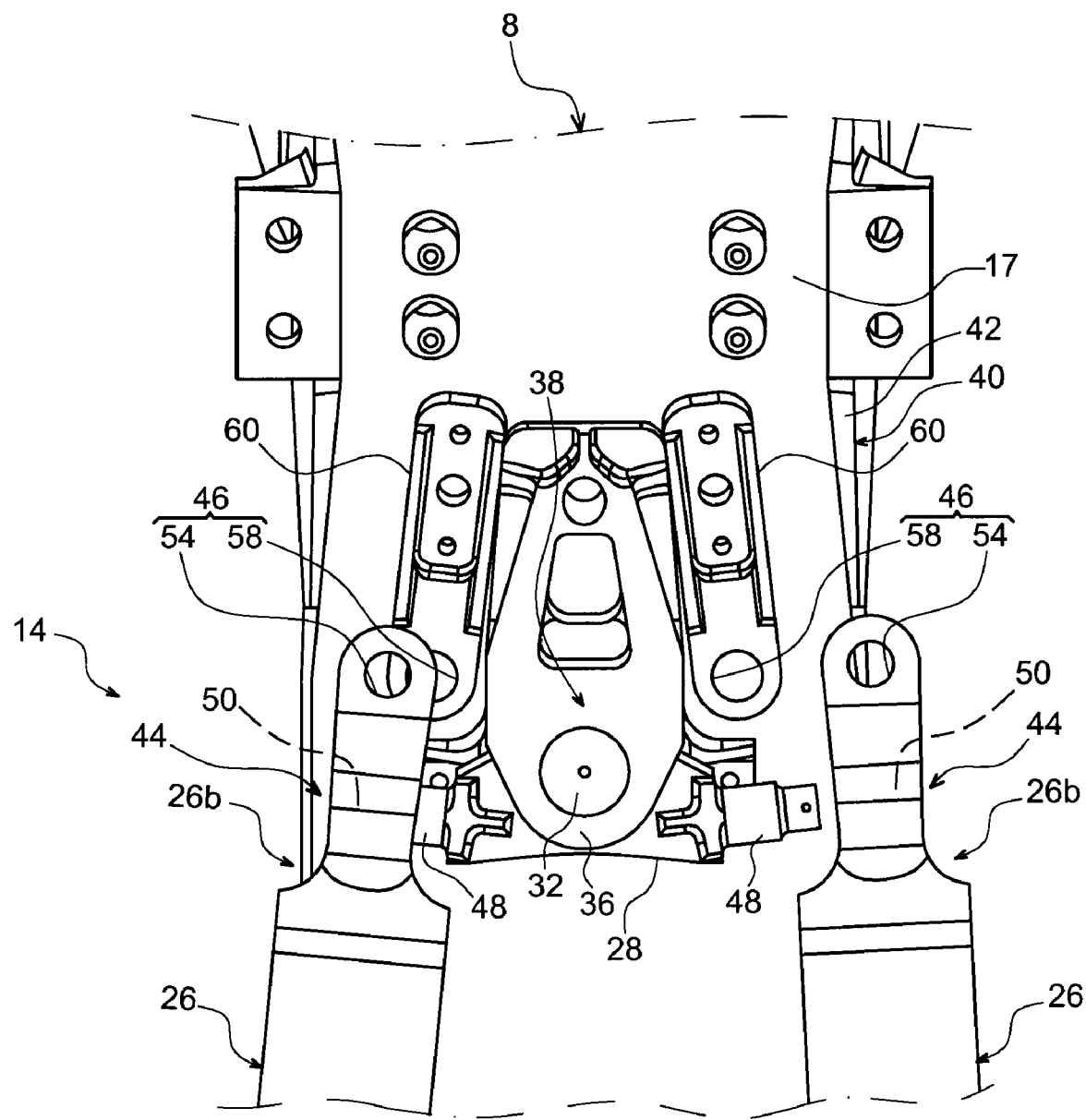

First of all, with reference to FIG. 7a, it can be seen that one of the specificities of the method lies in the fact that prior to mounting the rear ends of the rods onto their respectively associated pins, the crossbar 28 is already added on the rigid structure 8, by means of the connection fitting 38. Naturally, before starting to engage the rear end 26b of the first rod 26 in its associated pin 48 as shown in FIG. 7b, the engine is suitably installed relative to the rigid structure 8 of the pylon.

Figure 7C:
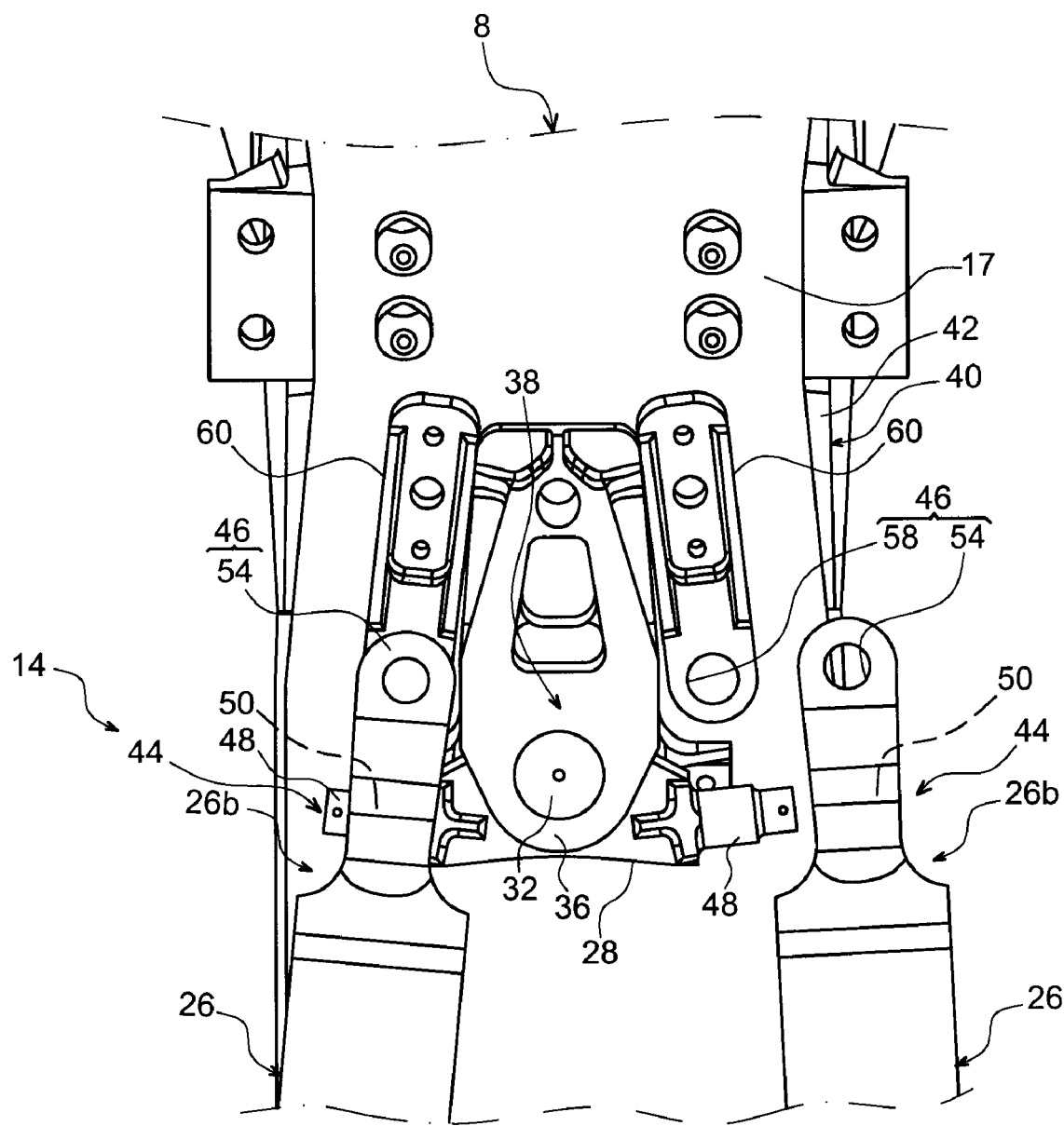

As mentioned previously, the rear end 26b of the rod 26 may be engaged by a simple substantially lateral movement thereof, located in proximity to the pin concerned. Moreover, since the rod 26 is already mounted at its front end 26a on the engine, the movement may have certain rough similarities to a weak rotation of the rod around its front end 26a, implemented so as to obtain a total engagement of the rear end 26b in the pin 48, as shown in FIG. 7c.

Figure 7D:
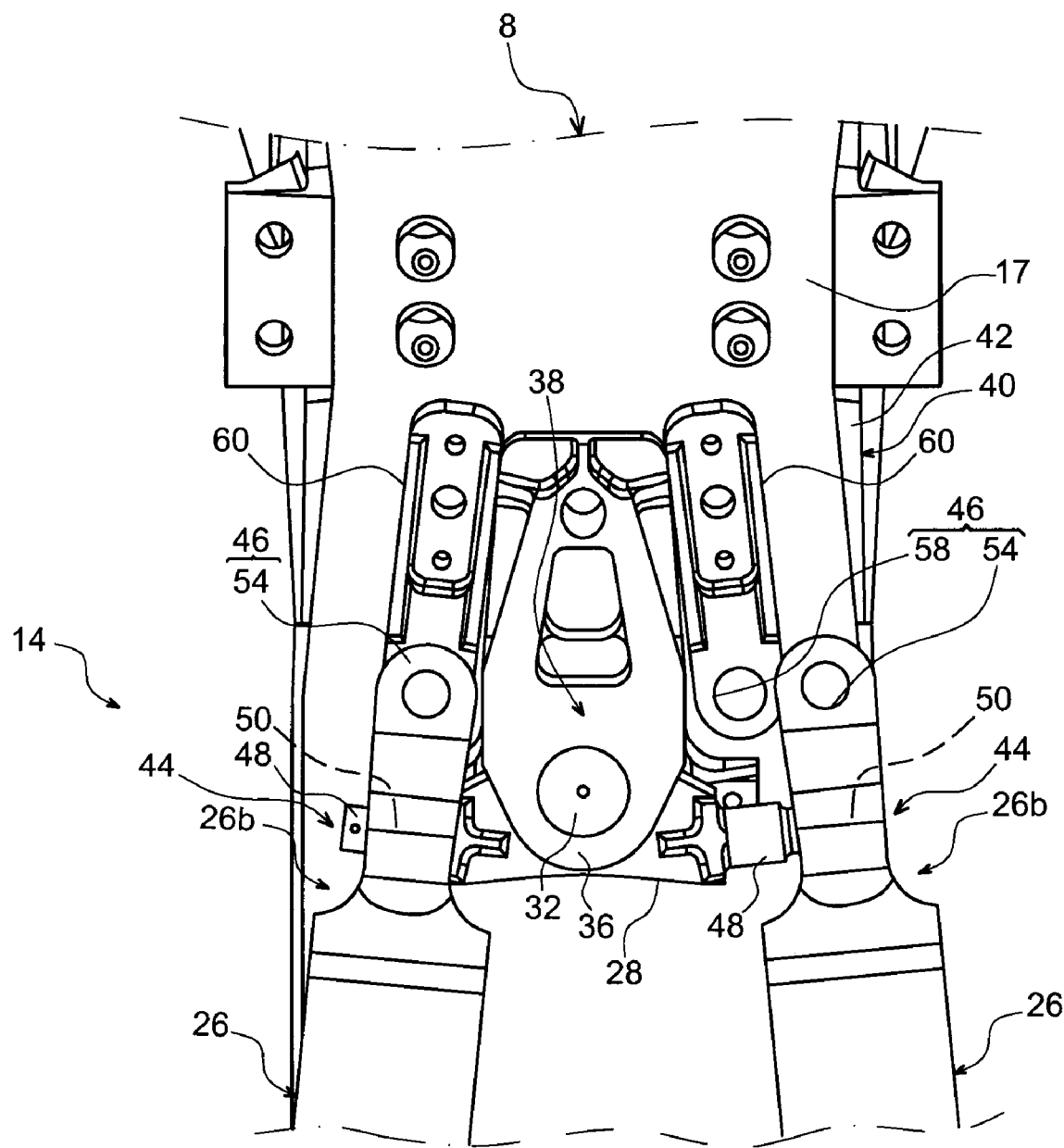
Figure 7E:
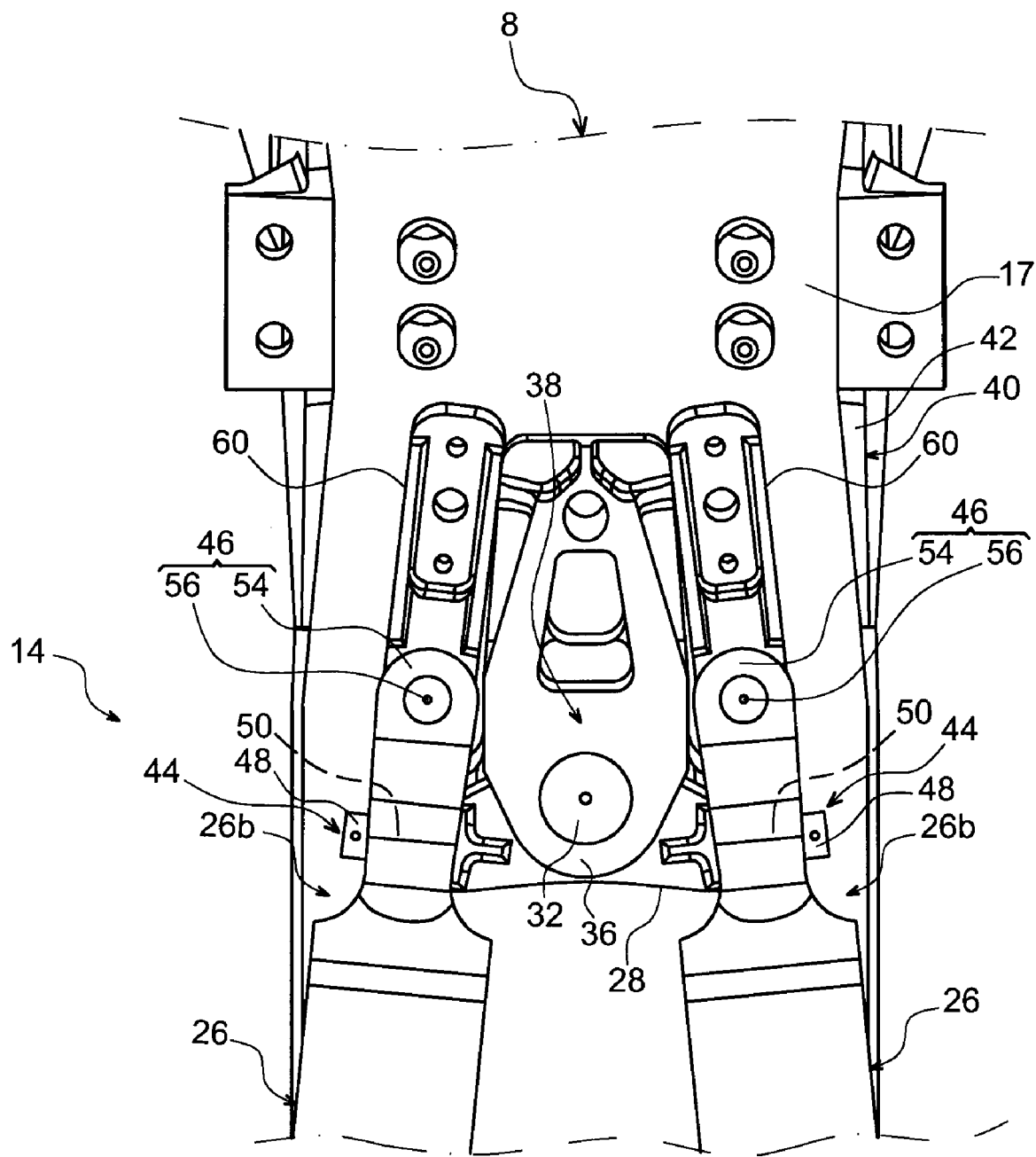

Next, the same operations are carried out for the other rod 26 as is shown in FIGS. 7d and 7e, although the two rods 26 could of course be mounted simultaneously, without departing from the framework of the invention.

It should be noted that the engagement of the rear ends of the rods in the respective pins allows the aforementioned mechanical connections to be obtained. As such, the second mechanical connection of each rod is, for its part, mounted only after obtaining the total engagement of this same rod in its associated crossbar pin.

Of course, various modifications may be made by the person skilled in the art to the mounting devices 4 and to the engine unit 1 which have just been described, solely by way of non-restrictive examples. In this respect, it may particularly be pointed out that although the engine unit 1 has been presented in a configuration adapted so that it is suspended under the wing of the aircraft, this unit 1 could also be presented in a different configuration allowing it to be mounted over this same wing, or even on the rear part of the fuselage of this aircraft.

The invention claimed is:

1. A mounting device for an aircraft engine mounted on a rigid structure, said mounting device comprising:

a thrust load recovery device for recovering the thrust loads generated by the engine, said thrust load recovery device comprising a crossbar and two lateral thrust load recovery rods each having a rear end mounted on the crossbar via, a first mechanical connection, and at the rear end of each of the two lateral thrust load recovery rods, a second mechanical connection with play between said rear end and a support fitting integral with the rigid structure, wherein said first mechanical connection comprises two pins, each pin being provided on an end of the crossbar and passing through an orifice provided in a corresponding rear end of one of the lateral thrust load recovery rods, each of the two pins of the cross bar being provided on the crossbar so as to extend substantially transversely relative to said mounting device.

2. A mounting device for an engine according to claim 1, wherein said second mechanical connection is located at the rear relative to said first mechanical connection.

3. A mounting device for an engine according to claim 1, wherein said orifice provided in the rear end of each of said lateral thrust load recovery rods is fitted with a ball-and-socket joint, wherein each of the two pins of the crossbar passes through a corresponding ball-and-socket joint.

4. A mounting device for an engine according to claim 1, wherein said second mechanical connection includes a clevis provided on the rear end of said rod and an orifice provided in said support fitting, said clevis and said orifice being passed through with play by a connection axis.

5. A mounting device for an engine according to claim 1, further comprising a front engine mount and a rear engine mount anchored to the rigid structure, said front engine mount being designed to recover loads being exerted along a transverse direction of the mounting device and along the vertical direction of this device, and said rear engine mount being designed to recover loads being exerted along the transverse and vertical directions of the device and to recover the momentum being exerted along a longitudinal direction of this device.

6. A mounting device for an engine according to claim 1, wherein said two lateral thrust load recovery rods are arranged on either side of a vertical and longitudinal median plane of the mounting device.

7. An engine unit including an engine and a device for mounting the engine, wherein said mounting device is a device according to claim 1.

8. An aircraft comprising at least one engine unit according to claim 7, said engine unit being assembled on a wing or on a rear fuselage part of this aircraft.

9. A mounting device for an engine according to claim 1, wherein said aircraft engine defines a longitudinal X direction, a transverse Y direction and a vertical Z direction, said X, Y, and Z direction being orthogonal to each other, and wherein said pins of said first connections are positioned along said Y direction such that free ends of said pins are oriented away from send aircraft engine.

10. A mounting device for an engine according to claim 9, wherein said pins of said first connections are positioned orthogonally relative to said two lateral thrust load recovery rods.

11. A mounting device for an engine according to claim 10, wherein the rear ends of said two lateral thrust load recovery rods are configured so as to be removable from said mounting device by disassembling the rear ends from said pins via a simple lateral movement of said lateral thrust load recovery rods.

* * * * *